United States Patent
Furuichi

(10) Patent No.: US 11,082,980 B2
(45) Date of Patent: Aug. 3, 2021

(54) INFORMATION PROCESSING APPARATUS, INFORMATION PROCESSING METHOD, AND WIRELESS COMMUNICATION APPARATUS

(71) Applicant: SONY CORPORATION, Tokyo (JP)

(72) Inventor: Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/644,266

(22) PCT Filed: Aug. 30, 2018

(86) PCT No.: PCT/JP2018/032085
§ 371 (c)(1),
(2) Date: Mar. 4, 2020

(87) PCT Pub. No.: WO2019/054186
PCT Pub. Date: Mar. 21, 2019

(65) Prior Publication Data
US 2021/0068108 A1    Mar. 4, 2021

(30) Foreign Application Priority Data

Sep. 13, 2017 (JP) .............................. JP2017-175455

(51) Int. Cl.
*H04W 72/04*    (2009.01)
*H04W 16/14*    (2009.01)

(52) U.S. Cl.
CPC ....... *H04W 72/0453* (2013.01); *H04W 16/14* (2013.01); *H04W 72/0493* (2013.01)

(58) Field of Classification Search
CPC ............. H04W 16/14; H04W 72/0453; H04W 72/0493

(Continued)

(56) References Cited

U.S. PATENT DOCUMENTS

| 9,547,400 B2* | 1/2017 | Waldron | ................ G06F 3/0412 |
| 2010/0069013 A1* | 3/2010 | Chaudhri | .............. H04W 16/14 |
| | | | 455/67.11 |

(Continued)

FOREIGN PATENT DOCUMENTS

| EP | 2858437 A1 | 4/2015 |
| JP | 2015-518356 A | 6/2015 |

(Continued)

OTHER PUBLICATIONS

International Search Report and Written Opinion of PCT Application No. PCT/JP2018/032085, dated Nov. 20, 2018, 06 pages of ISRWO.

(Continued)

*Primary Examiner* — Joel Ajayi
(74) *Attorney, Agent, or Firm* — Chip Law Group

(57) ABSTRACT

The present disclosure relates to an information processing apparatus, an information processing method, and a wireless communication apparatus that may enable more reliable detection of presence of a signal of a primary system. A learning unit carries out learning of frequency utilization statistics information regarding a secondary system, with use of information regarding a frequency occupancy situation of the secondary system which shares a frequency or a frequency band allocated to the primary system, at least as teacher information, and with use of sensing data collected by a sensor unit which senses a radio wave environment, as student information. A detection unit carries out detection processing based on the frequency utilization statistics information and, upon detection of the presence of the signal of the primary system, gives detection notification or radio wave stoppage instructions to other wireless communication apparatuses utilizing a frequency for the secondary system.

8 Claims, 9 Drawing Sheets

(58) Field of Classification Search
USPC .................................................... 455/452.1
See application file for complete search history.

(56) References Cited

U.S. PATENT DOCUMENTS

2015/0131550 A1   5/2015   Guo
2016/0352547 A1   12/2016  Guo

FOREIGN PATENT DOCUMENTS

JP    2017-118384 A    6/2017
WO    2013/177984 A1   12/2013

OTHER PUBLICATIONS

Extended European Search Report of EP Application No. 18855414.1, dated Oct. 22, 2020, 11 pages.
"ITU-R PDNR LMS.CRS ; 18-11-0019-00-0000-itu-r-pdnr-lms-crs", ITU-R Working Party 5A, IEEE SA Mentor, vol. 802. 18, XP068043677, Piscataway, NJ, USA, Feb. 8, 2011, 68 pages.
Bkassiny, et al., "A Survey on Machine-Learning Techniques in Cognitive Radios", IEEE Communications Surveys and Tutorials, vol. 15, No. 3, Jul. 1, 2013, pp. 1136-1159.
Ahmed, et al., "Spectrum Monitoring for Radar Bands Using Deep Convolutional Neural Networks", GLOBECOM 2017-2017 IEEE Global Communications Conference, IEEE, Dec. 4, 2017, 06 pages.

* cited by examiner

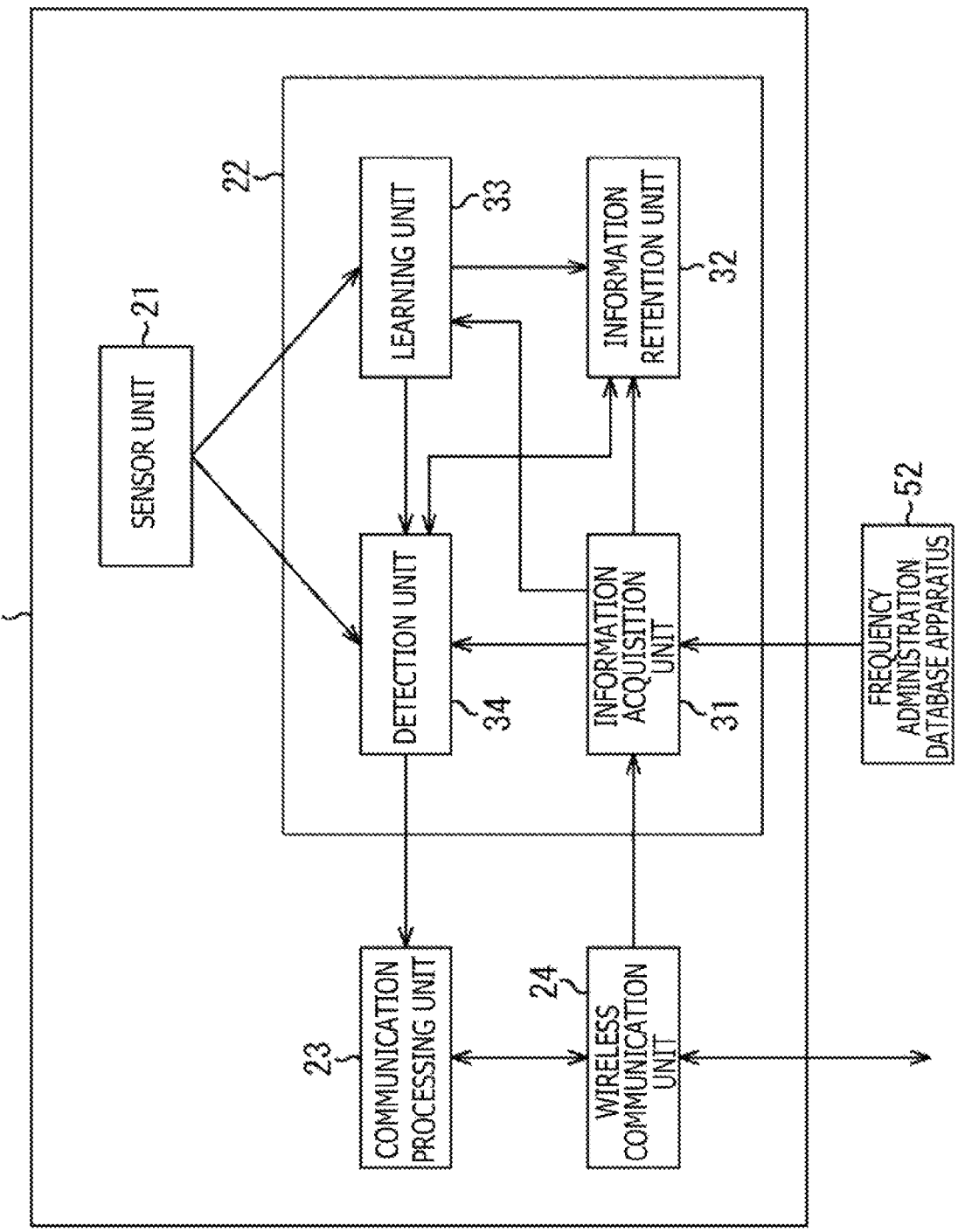
F I G. 6

INFORMATION PROCESSING APPARATUS, INFORMATION PROCESSING METHOD, AND WIRELESS COMMUNICATION APPARATUS

CROSS REFERENCE TO RELATED APPLICATIONS

This application is a U.S. National Phase of International Patent Application No. PCT/JP2018/032085 filed on Aug. 30, 2018, which claims priority benefit of Japanese Patent Application No. JP 2017-175455 filed in the Japan Patent Office on Sep. 13, 2017. Each of the above-referenced applications is hereby incorporated herein by reference in its entirety.

TECHNICAL FIELD

The present disclosure relates to an information processing apparatus, an information processing method, a program, and a wireless communication apparatus and particularly relates to an information processing apparatus, an information processing method, a program, and a wireless communication apparatus that may enable more reliable detection of presence of a signal of a primary system.

BACKGROUND ART

For wireless communication with use of radio waves, in the past, legislation and standardization for a system of secondary use of frequencies have been advanced because of a deficiency of frequencies that may be newly allocated. As representative examples of such a system, frequency utilization administration based on frequency administration database, detection and protection of a primary system through frequency sensing, and the like may be enumerated.

Dynamic frequency selection (DFS) provided for use with weather radar in 5 GHz band is among representative examples of the frequency sensing, for instance, and investigations on frequencies that may be newly shared have been made based on this system.

For instance, PTL 1 discloses a method of carrying out DFS through central control based on measurement reports from a plurality of wireless access nodes in detection of radar signals in 5 GHz wireless frequency band.

CITATION LIST

Patent Literature

[PTL 1]
U.S. Patent Application Publication No. 2017/0026845

SUMMARY

Technical Problems

In PTL 1 described above, however, no specific disclosure is made as to how presence or absence of radar signals is to be determined. In addition, improvements are demanded with regard to DFS, in particular, with regard to undetectability for signals of unknown radar, absence of update on DFS function for appearance of new type of radar, and the like.

Though the frequency administration based on the frequency administration database enables advanced protection of the primary system, additionally, the frequency administration has poorer responsiveness than DFS in that a wireless communication apparatus is made incapable of determining availability by itself based on only the frequency administration. Therefore, there is a demand for attainment by DFS of frequency sensing that enables determination as accurate as possible based on any radar signal.

The present disclosure has been made in consideration of such a situation and aims at enabling more reliable detection of presence of a signal of a primary system.

Solution to Problems

An information processing apparatus according to an aspect of the present disclosure includes a learning unit that carries out learning of frequency utilization statistics information regarding a secondary system, with use of information regarding a frequency occupancy situation of the secondary system which shares a frequency or a frequency band allocated to a primary system, at least as teacher information, and with use of sensing data collected by a sensor unit which senses a radio wave environment, as student information, and a detection unit that carries out detection processing for detecting whether or not a signal of the primary system is present, based on the frequency utilization statistics information regarding the secondary system acquired through the learning by the learning unit.

An information processing method according to an aspect of the present disclosure includes, by an information processing apparatus that carries out information processing, carrying out learning of frequency utilization statistics information regarding a secondary system, with use of information regarding a frequency occupancy situation of the secondary system which shares a frequency or a frequency band allocated to a primary system, at least as teacher information, and with use of sensing data collected by a sensor unit which senses a radio wave environment, as student information, and carrying out detection processing for detecting whether or not a signal of the primary system is present, based on the frequency utilization statistics information regarding the secondary system acquired through the learning.

A program according to an aspect of the present disclosure causes a computer of an information processing apparatus which carries out information processing, to execute information processing including carrying out learning of frequency utilization statistics information regarding a secondary system, with use of information regarding a frequency occupancy situation of the secondary system which shares a frequency or a frequency band allocated to a primary system, at least as teacher information, and with use of sensing data collected by a sensor unit which senses a radio wave environment, as student information, and carrying out detection processing for detecting whether or not a signal of the primary system is present, based on the frequency utilization statistics information regarding the secondary system acquired through the learning.

A wireless communication apparatus according to an aspect of the present disclosure includes a learning unit that carries out learning of frequency utilization statistics information regarding a secondary system, with use of information regarding a frequency occupancy situation of the secondary system which shares a frequency or a frequency band allocated to a primary system, at least as teacher information, and with use of sensing data collected by a sensor unit which senses a radio wave environment, as student information, a detection unit that carries out detection processing for detecting whether or not a signal of the primary system is present, based on the frequency utilization statistics information regarding the secondary system acquired through the learning by the learning unit, and a communication processing unit that gives detection notification or radio wave stoppage instructions through wireless communication to other wireless communication apparatuses utilizing a frequency for the secondary system in a case where the detection unit detects the presence of the signal of the primary system.

In an aspect of the present disclosure, the learning of the frequency utilization statistics information regarding the secondary system is carried out, with use of the information regarding the frequency occupancy situation of the secondary system which shares the frequency or the frequency band allocated to the primary system, at least as the teacher information, and with use of the sensing data collected by the sensor unit which senses the radio wave environment, as the student information. In addition, the detection processing for detecting whether or not the signal of the primary system is present is carried out based on the frequency utilization statistics information regarding the secondary system acquired through the learning.

Advantageous Effect of Invention

According to an aspect of the present disclosure, more reliable detection of the presence of the signal of the primary system may be enabled.

Meanwhile, effect described herein is not necessarily limitative and may be any of effects described in the present disclosure.

BRIEF DESCRIPTION OF DRAWINGS

FIG. 6 is a block diagram illustrating a configuration example of a wireless communication apparatus with learning sensing function.

DESCRIPTION OF EMBODIMENT

Hereinbelow, a specific embodiment to which the present technique is applied will be described in detail with reference to the drawings.

<Configuration Example of Wireless Communication Apparatus>

Figure 1:
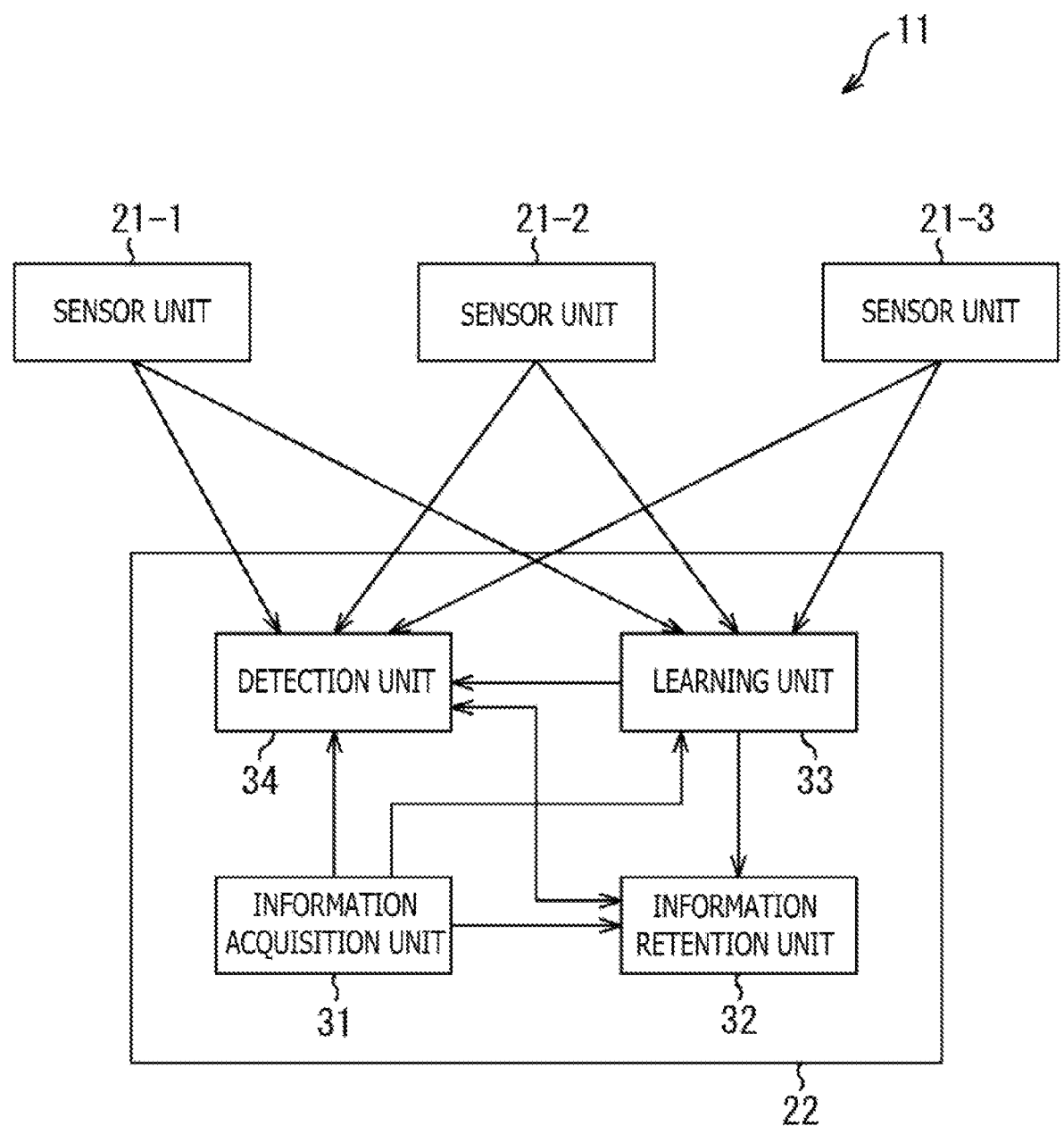
FIG. 1 is a block diagram illustrating a configuration example of an embodiment of a radio wave environment learning apparatus to which the present technique is applied.

FIG. 1 is a block diagram illustrating a configuration example of an embodiment of a radio wave environment learning apparatus that is an information processing apparatus to which the present technique is applied.

As illustrated in FIG. 1, a radio wave environment learning apparatus 11, including a plurality of sensor units 21 (three sensor units 21-1 through 21-3, in the example of FIG. 1) connected to an information processing apparatus 22, can be utilized in a wireless communication apparatus that utilizes of a secondary system which shares a frequency or a frequency band allocated to a primary system, for instance. In addition, the information processing apparatus 22 includes an information acquisition unit 31, an information retention unit 32, a learning unit 33, and a detection unit 34.

The sensor units 21 have a function of sensing of a radio wave environment at an installation position of the radio wave environment learning apparatus 11 and respectively supply sensing data collected through the sensing to the learning unit 33 and the detection unit 34 of the information processing apparatus 22.

The information acquisition unit 31 acquires information regarding a frequency occupancy situation of the secondary system (which will be appropriately referred to as "secondary frequency information" hereinbelow) and supplies the information to the information retention unit 32, the learning unit 33, and the detection unit 34. For instance, the information acquisition unit 31 can acquire the secondary frequency information provided from a frequency administration database not illustrated, the secondary system, or the like.

The information retention unit 32 retains the secondary frequency information supplied from the information acquisition unit 31 and additionally retains such contents of learning by the learning unit 33 as will be described later, criteria information to be used by the detection unit 34, and the like.

The learning unit 33 has a function of learning frequency utilization statistics information regarding the secondary system, for instance, as information demanded for determination of presence of a signal of the primary system by the detection unit 34, with use of the secondary frequency information supplied from the information acquisition unit 31. Besides, the learning unit 33 supplies the information retention unit 32 with the contents of learning that represent information acquired through learning, so as to make the information retention unit 32 retain the contents of learning, or supplies the detection unit 34 with the contents of learning. Upon supply of new secondary frequency information, for instance, the learning unit 33 can update the contents of learning retained in the information retention unit 32, by carrying out learning.

The detection unit 34 matches the sensing data supplied from the sensor units 21 with the contents of learning acquired through the learning by the learning unit 33 and calculates a degree of correlation therebetween. Alternatively, the detection unit 34 may read out the contents of learning retained in the information retention unit 32. Besides, the detection unit 34 has a function (system or algorithm) of detecting the presence of the signal of the primary system through a comparison between the calculated degree of correlation and the criteria information retained in the information retention unit 32.

The radio wave environment learning apparatus 11 configured in such a manner is capable of more reliably detecting the presence of the signal of the primary system by detecting the presence of the signal of the primary system with use of the contents of learning acquired through the learning in which the secondary frequency information is utilized.

Herein, basic actions of processing that is carried out in the radio wave environment learning apparatus 11 will be described.

<Radio Wave Environment Learning Processing by Learning Unit>

The learning unit 33 can acquire the information (contents of learning) demanded for the determination of the presence of the signal of the primary system by the detection unit 34, by carrying out the learning.

Frequency occupancy utilization information regarding the secondary system, frequency characteristics that are measured in a case where a frequency is not utilized by the secondary system, or the like can be utilized as the secondary frequency information that is used as teacher information for the learning by the learning unit 33, for instance.

The frequency occupancy utilization information regarding the secondary system includes statistics information, current action operation parameter information, and wireless access technique information. As the statistics information, channel occupancy rate, rate of utilization, or the like is used, for instance. As the current action operation parameter information, furthermore, positional information, antenna information, or the like and transmission power, frequency, or the like are used, for instance. As the wireless access technique information, furthermore, RAT (Radio Access Technology), modulation method, or the like and transmission frame information (specifically, TDD (Time Division Duplex) configuration or the like) are used, for instance.

The frequency characteristics that are measured in a case where the frequency is not utilized by the secondary system include spectrum (frequency characteristics that may be observed by a spectrum analyzer) and statistics information regarding white noise component.

Meanwhile, the learning unit 33 can learn reference signals for aid to learning sensing that are transmitted by the secondary system and can learn the reference signals by making the sensor units 21 receive known reference signals from one another, for instance. Thus, the learning unit 33 is made capable of learning factors such as propagation path loss or shadowing attenuation, as well.

The information acquisition unit 31 can acquire such secondary frequency information from such a spectrum coordinator as the frequency administration database, for instance. Alternatively, the information acquisition unit 31 may directly acquire the information from communication nodes acting as the secondary system.

In addition, the learning unit 33 can carry out learning in which requirements of wireless communication apparatuses stipulated in radio wave law of a relevant country are used as the secondary frequency information as the teacher information. For instance, the secondary frequency information can include conformity requirements for technical regulations in Japan or requirements stipulated in standards of ETSI EN 301 598 (for TV white space device) and EN 301 893 (for 5 GHz RLAN) that are standards corresponding to the conformity requirements for technical regulations in Europe. Specifically, the secondary frequency information may include spectrum mask, maximum EIRP (Equivalent Isotropic Radiated Power), or the like.

Thus, the learning unit 33 can carry out learning by using various types of the secondary frequency information as described above, as the teacher information, and by inputting received signals, assumed to be received by the sensor units 21, as student information. That is, the learning unit 33 can carry out the learning, in regard to a received signal r(t) for the sensor units 21, by using a received signal $x_n(t)$ and a noise component n(t) that are assumed regarding n-th secondary system at time t, in accordance with following expression (1).

[Math. 1]

$$r(t) = \Sigma_{n=0}^{N-1}(x_n(t)) + n(t) \quad (1)$$

Herein, the learning unit 33 can carry out the learning with conversion into frequency domain signals posterior to Fourier transformation, for instance.

Besides, the received signal that is assumed regarding the secondary system can be calculated from the current action and operation parameter information, the wireless access technique information, or the like as described above, for instance. Additionally, the propagation path loss can be estimated based on installation positions of the sensor units 21 and an installation position of the secondary system and can be calculated through addition and subtraction with use of antenna gain, the transmission power, and the like. Meanwhile, random numbers can be used for the noise component n(t).

In the above described expression (1) for calculation of the received signal r(t), moreover, the reference signal for the aid to the learning sensing that is transmitted by the secondary system can be applied as the received signal at time of reception by the sensor units 21. Similarly, use of the requirements of wireless communication apparatuses stipulated in the radio wave law of the relevant country can be applied to the above described expression (1) for the calculation of the received signal r(t).

It is to be noted that, for any of forms of the received signal, it is preferable that a sampling interval be shorter than for a signal assumed to be used in the primary system. In a case where the primary system is assumed to be radar, for instance, sampling within time shorter than pulses of the radar is desirable.

Thus, the learning unit 33 can acquire probability density function/probability distribution function of frequency spectrum of the secondary system, for instance, as the contents of learning, by carrying out learning in which the received signals are used as the student information. That is, the learning unit 33 can calculate the probability density function $PDF_f(a)$ or the probability distribution function $CDF_f(a)$ at a frequency f, with use of the received signal r(t) to be learned at each time as a sample and with use of a random variable a of received power.

Furthermore, the learning unit 33 can acquire probability density functions/probability distribution functions numbered in $2^N$ of the frequency spectrum, as the contents of learning, for combinations numbered in N and generated in accordance with the number of secondary systems in action among installed secondary systems.

When the learning unit 33 learns the secondary frequency information, furthermore, learning algorithm may be made to extract features. For instance, the learning unit 33 can make the algorithm extract parameters indicating features of relation between actions of the secondary systems and the frequency characteristics, a comparison between an accumulated radio wave of the secondary systems and conformity requirement values for the technical regulations, or the like.

For instance, a feature as to how the frequency characteristics of the signals received by the sensor units 21 change with change of the actions of the secondary system is extracted as the relation between the actions of the secondary systems and the frequency characteristics. Specifically, an average, a variance, or the like of the probability density functions $PDF_f(a)$ or the probability distribution functions $CDF_f(a)$ can be calculated as a degree of such change. Meanwhile, the probability density function/probability distribution function of a difference $\Delta t$ (=t2−t1) regarding time t1 and t2 when the change occurs can be calculated as a frequency of the change. Furthermore, these features may be extracted for each of predetermined frequency blocks.

Figure 2:
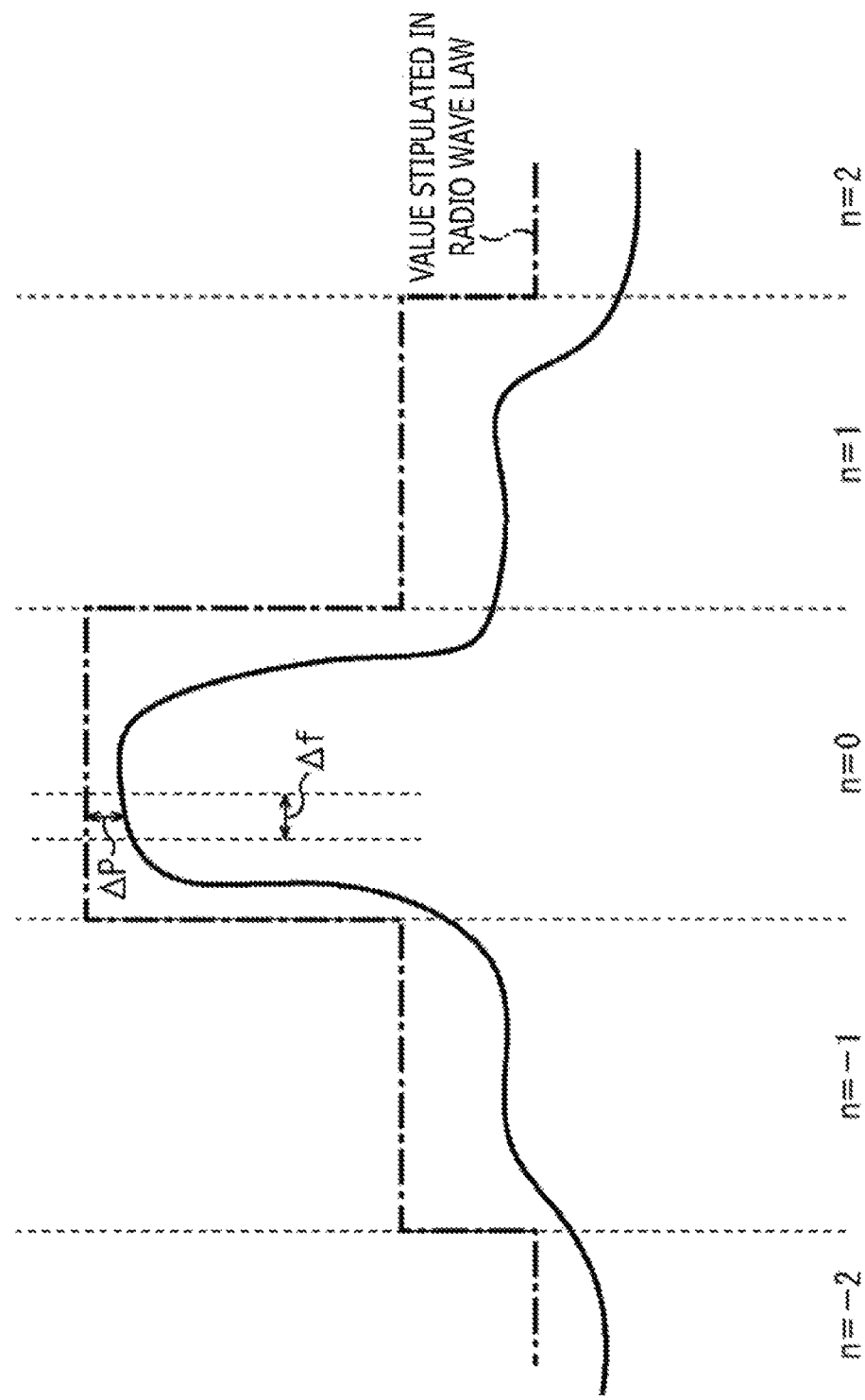
FIG. 2 is a diagram for description of a difference between a spectrum mask stipulated in radio wave law and an accumulated radio wave sensing value.

As the comparison between the accumulated radio wave of the secondary systems and the conformity requirement value for the technical regulations, meanwhile, a statistic of a difference $\Delta P$ between the spectrum mask stipulated in the radio wave law and the accumulated radio wave sensing value of as illustrated in FIG. 2 can be calculated, for instance. That is, the statistic such as an average or a variance of the difference $\Delta P$ at a frequency can be calculated.

<Primary Signal Detection Processing by Detection Unit>

The detection unit 34 can match the sensing data acquired from the sensor units 21 with the contents of learning obtained as a result of the learning by the learning unit 33.

The detection unit 34 can determine the presence of the signal of the primary system, in a case where a change of the frequency characteristics in a period from the time t to slightly advanced time t+α does not coincide with the contents of learning or indicates an abnormal state that is conceived to be impossible to occur based on the contents of learning, for instance. Specifically, the detection unit 34 can determine the presence of the signal of the primary system, in a case where a sample value of the sensing data is not included in an arbitrary interval [−kσ, kσ] determined based on a standard deviation of the probability density function or the probability distribution function described above. Therein, k is an arbitrary integer and σ is the standard deviation.

Upon a determination of the presence of the signal of the primary system, the detection unit 34 further performs a procedure for stopping operation of the secondary systems without fail. The procedure may be detection notification which notifies the spectrum coordinator such as the frequency administration database that the presence of the signal of the primary system has been detected, for instance. In a case where a communication node itself includes the detection unit 34, for instance, the communication node may directly carry out processing for stopping radio waves of the communication node itself.

In a case where wired interfaces (X2 interfaces in LTE (Long Term Evolution) system, WLAN (Wireless LAN) wireless access points, or the like belonging to the same router, for instance) are provided among the communication nodes, for instance, the detection notification of the presence of the signal of the primary system can be further given to other communication nodes with utilization of the wired interfaces. Furthermore, the detection notification with use of wireless communication on another available frequency may be given to the communication nodes, if possible, for instance.

After matching by the detection unit 34, the learning unit 33 may be further made to learn the sensing data, irrespective of the presence or absence of the signal of the primary system. On condition that the sensing data is made to be learned in the presence of the signal of the primary system, for instance, the detection unit 34 may determine the presence of the signal of the primary system in a case where a similar change of the frequency characteristics is observed in subsequent matching.

Herein, the criteria information that is utilized by the detection unit 34 can be retained (updated) in the information retention unit 32 through software update via a network.

<Radio Wave Environment Learning Processing>

With reference to a flow chart illustrated in FIG. 3, radio wave environment learning processing that is carried out in the information processing apparatus 22 will be described.

The information processing apparatus 22 starts the radio wave environment learning processing upon new preparation of the secondary frequency information that is used as the teacher information, for instance. In step S11, the information acquisition unit 31 acquires the secondary frequency information provided from the frequency administration database, the secondary system, or the like, as the teacher information to be used for the learning and supplies the secondary frequency information to the information retention unit 32 so as to make the information retention unit 32 retain the secondary frequency information.

In step S12, the learning unit 33 acquires the sensing data collected through the sensing of the radio wave environment by the sensor units 21, as the student information to be used for the learning.

In step S13, the learning unit 33 learns the frequency utilization statistics information regarding the secondary system, by using the secondary frequency information, read out from the information retention unit 32, as the teacher information, and using the sensing data, acquired from the sensor units 21 in step S12, as the student information. For instance, the learning unit 33 learns the probability density function/probability distribution function of the frequency spectrum of the secondary system, through calculation with use of the expression (1) described above.

In step S14, the learning unit 33 supplies the information retention unit 32 with the frequency utilization statistics information, acquired through learning in step S13, as the contents of learning so as to make the information retention unit 32 retain the frequency utilization statistics information and the radio wave environment learning processing is thereafter ended.

<Primary Signal Detection Processing>

With reference to a flow chart illustrated in FIG. 4, primary signal detection processing that is carried out in the information processing apparatus 22 will be described.

The information processing apparatus 22 can carry out the primary signal detection processing periodically at specified timing, for instance, and, in step S21, the detection unit 34 acquires the sensing data collected through the sensing of the radio wave environment by the sensor units 21.

Figure 3:
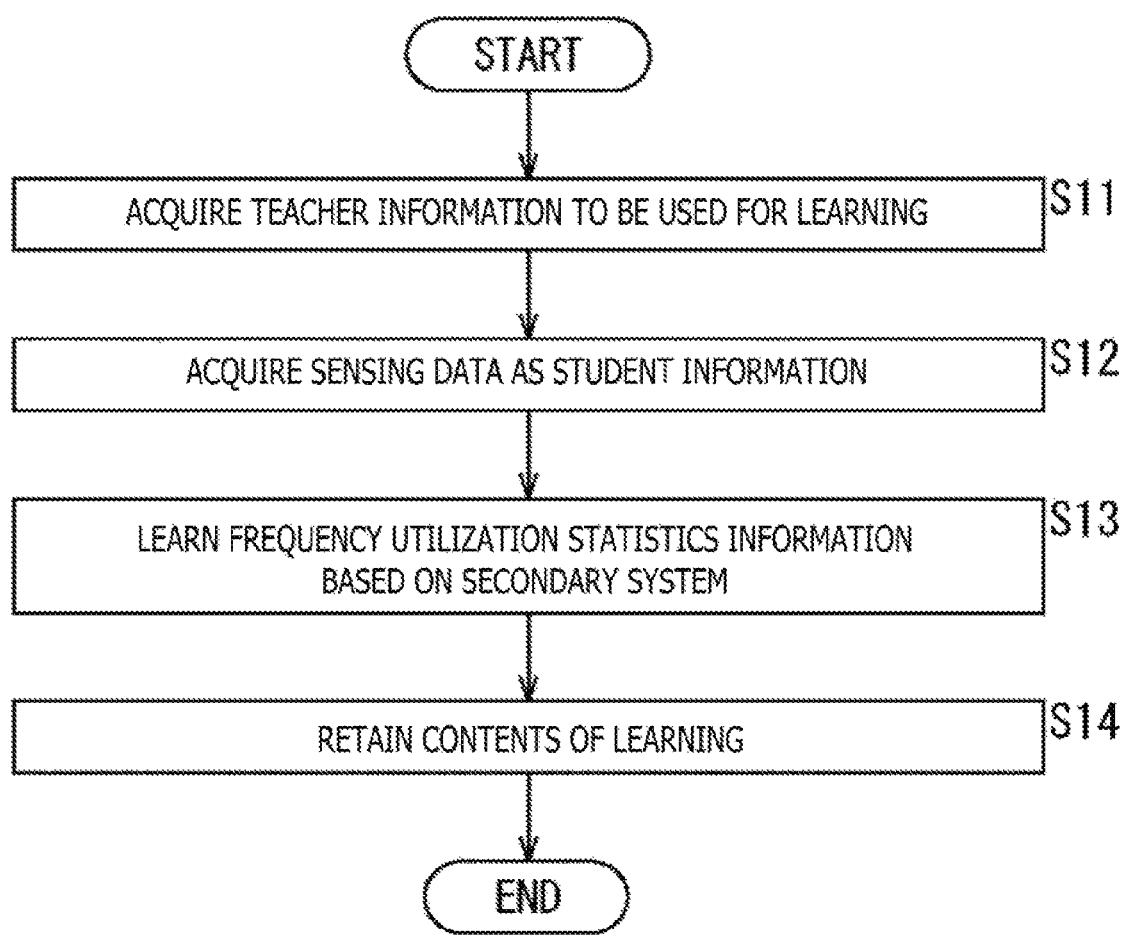
FIG. 3 is a flow chart for description of radio wave environment learning processing.

In step S22, the detection unit 34 reads out the contents of learning retained in the information retention unit 32 by the learning unit 33 in the radio wave environment learning processing of FIG. 3.

In step S23, the detection unit 34 carries out the detection processing for detection of the presence or absence of the signal of the primary system, by matching the sensing data acquired in step S21 with the contents of learning read out in step S22.

In step S24, the detection unit 34 determines whether or not the presence of the signal of the primary system has been detected as a result of the detection processing of step S23. As described above, the detection unit 34 can determine the presence of the signal of the primary system in a case where the change of the frequency characteristics in the period from the time t to the slightly advanced time t+α does not coincide with the contents of learning or indicates the abnormal state that is conceived to be impossible to occur based on the contents of learning.

If the detection unit 34 determines in step S24 that the presence of the signal of the primary system has not been detected, the processing makes a return to step S21 and stands by until subsequent timing and similar processing is iterated thereafter.

In a case where the detection unit 34 determines in step S24 that the presence of the signal of the primary system has been detected, by contrast, the processing advances to step S25.

In step S25, the detection unit 34 gives notification that the signal of the primary system is present and performs the procedure for stopping the operation of the secondary system. After that, the processing makes a return to step S21 and stands by until subsequent timing and similar processing is iterated thereafter.

As described above, the information processing apparatus 22 can acquire the information demanded for the determination of the presence of the signal of the primary system by the detection unit 34, without a demand for information indicating features of the signal of the primary system, for instance, by carrying out the radio wave environment learning processing (FIG. 3) with use of the secondary frequency information and the sensing data. Thus, the detection unit 34 is capable of more reliably detecting the presence of the signal of the primary system, even if the signal of the primary system is unknown, for instance.

By carrying out the radio wave environment learning processing in accordance with update of the secondary frequency information, furthermore, the information processing apparatus 22 can renew the contents of learning or can update the criteria information that is used by the detection unit 34. In a case where a new type of radar appears, for instance, the information processing apparatus 22 is thus capable of detecting signals of the new type of radar by the detection unit 34.

<Configuration Example of Wireless Communication System>

Figure 5:
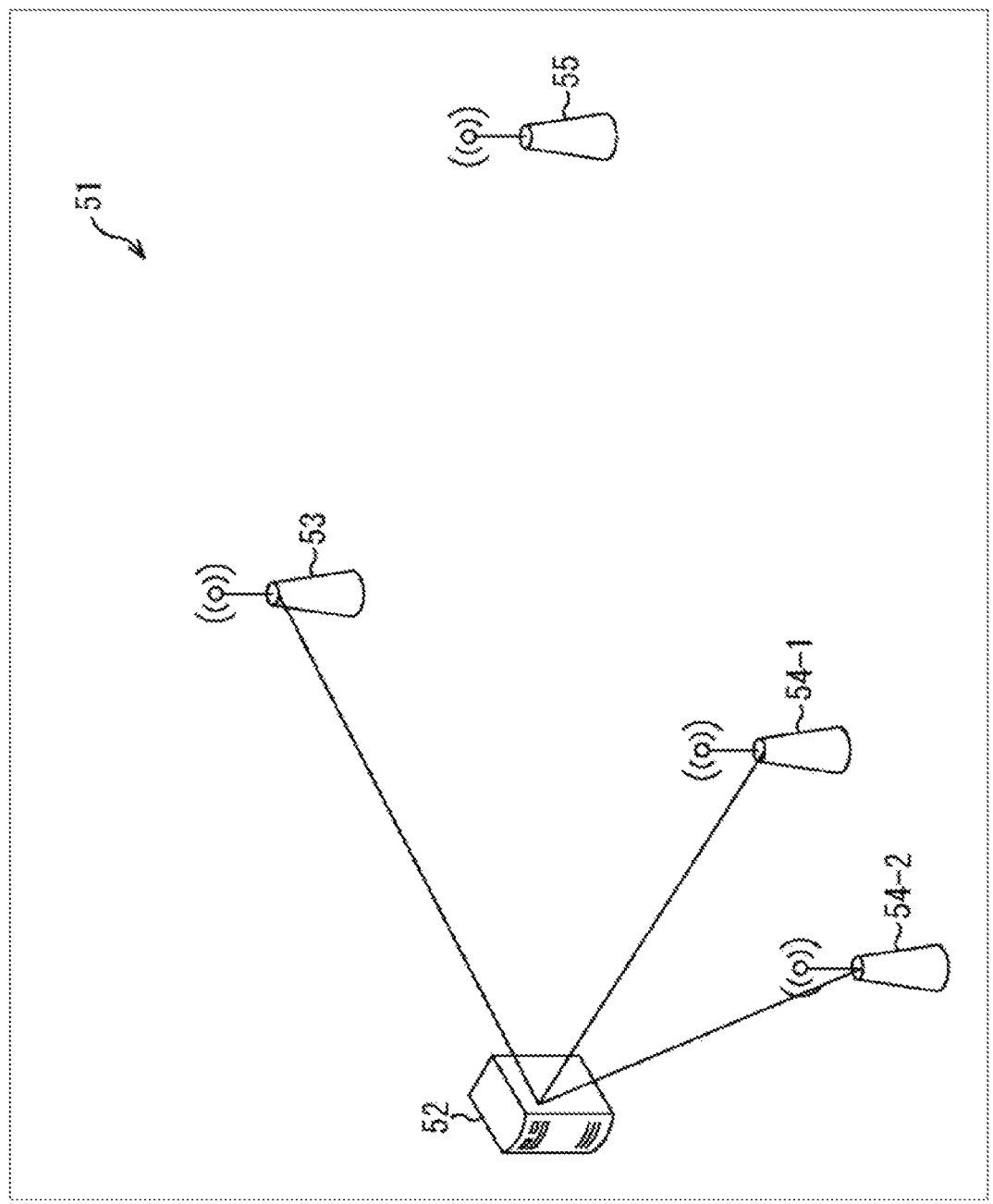
FIG. 5 is a diagram for description of a configuration example of a wireless communication system.

FIG. 5 is a diagram illustrating a configuration example of a wireless communication system in which a wireless communication apparatus with learning sensing function including the information processing apparatus 22 of FIG. 1 is incorporated.

In FIG. 5, a wireless communication system 51 includes a frequency administration database 52, a wireless communication apparatus 53 with learning sensing function, a plurality of general wireless communication apparatuses 54 (two general wireless communication apparatuses 54-1 and 54-2 in the example of FIG. 5), and a wireless communication apparatus 55 with sensing function.

In the wireless communication system 51, as further illustrated in FIG. 5, the wireless communication apparatus 53 with learning sensing function and the plurality of general wireless communication apparatuses 54 are connected through wired interfaces to the frequency administration database 52. The wireless communication apparatus 55 with sensing function, however, is not connected through a wired interface to those apparatuses and is operated in stand-alone mode without being administered by the frequency administration database 52.

The frequency administration database 52 administers the wireless communication apparatus 53 with learning sensing function and the general wireless communication apparatuses 54 and carries out frequency administration and detection (sensing) of vacant frequency band based on the sensing, with respect to the same frequency band.

The wireless communication apparatus 53 with learning sensing function includes the information processing apparatus 22 that is similar to the radio wave environment learning apparatus 11 of FIG. 1, as illustrated in FIG. 6 to be described later, and is capable of carrying out the learning sensing (sensing based on such learning algorithm as described above). In addition, the wireless communication apparatus 53 with learning sensing function is operated under administration by the frequency administration database 52 and is capable of carrying out ordinary wireless communication.

The general wireless communication apparatuses 54, which are wireless communication apparatuses that do not have a sensing function, are operated under the administration by the frequency administration database 52 and are capable of carrying out ordinary wireless communication.

The wireless communication apparatus 55 with sensing function includes the sensor unit 21 of FIG. 1, for instance, and is capable of supplying sensing data, acquired by the sensor unit 21, to the wireless communication apparatus 53 with learning sensing function through wireless communication.

Subsequently, FIG. 6 is a block diagram illustrating a configuration example of the wireless communication apparatus 53 with learning sensing function.

As illustrated in FIG. 6, the wireless communication apparatus 53 with learning sensing function includes the sensor unit 21, the information processing apparatus 22, a communication processing unit 23, and a wireless communication unit 24. Herein, the sensor unit 21 and the information processing apparatus 22 are configured similar to FIG. 1 and thus detailed description will be omitted. Furthermore, it is preferable that a wired interface connected to the frequency administration database 52 be configured so as to be connected to the information acquisition unit 31.

The communication processing unit 23 controls the wireless communication unit 24 and thereby carries out various types of processing for wireless communication by the wireless communication apparatus 53 with learning sensing function. In a case where the detection unit 34 detects the presence of the signal of the primary system, for instance, the communication processing unit 23 can carry out communication processing for transmitting notification of such detection to the wireless communication apparatus 55 with sensing function. Then the communication processing unit 23 can control the wireless communication unit 24 so as to stop radio waves.

The wireless communication unit 24 is capable of carrying out wireless communication with other wireless communication apparatuses. The wireless communication unit 24 is connected to the information acquisition unit 31 and is capable of supplying the information acquisition unit 31 with information provided from other wireless communication apparatuses through the wireless communication. For instance, the wireless communication unit 24 supplies the information acquisition unit 31 with the sensing data provided from the wireless communication apparatus 55 with sensing function.

The wireless communication apparatus 53 with learning sensing function that is configured in such a manner can carry out the learning sensing by the information processing apparatus 22, in parallel with operation of the ordinary wireless communication by the communication processing unit 23. Furthermore, the wireless communication apparatus 53 with learning sensing function can carry out the learning sensing with use of the sensing data provided from the wireless communication apparatus 55 with sensing function, in addition to the sensing data acquired through sensing by the sensor unit 21 of the wireless communication apparatus 53 itself.

In a case where the detection unit 34 detects the presence of the signal of the primary system, additionally, the wireless communication apparatus 53 with learning sensing function can stop its own radio waves to be outputted from the wireless communication unit 24, in accordance with control by the communication processing unit 23.

Meanwhile, the wireless communication apparatus 53 with learning sensing function can transmit the detection notification or a radio wave stoppage instruction to the wireless communication apparatus 55 with sensing function, before stopping its own radio waves. Herein, the wireless communication apparatus 53 with learning sensing function outputs the radio waves in ordinary operation. In a case where the radio waves outputted from the wireless communication apparatus 53 with learning sensing function become undetectable within given time, therefore, the wireless communication apparatus 55 with sensing function may determine that the presence of the signal of the primary system has been detected in the wireless communication apparatus 53 with learning sensing function and may stop its own radio waves.

In addition, the wireless communication apparatus 53 with learning sensing function can give the detection notification to the frequency administration database 52 after stopping its own radio waves. Upon reception of the detection notification, the frequency administration database 52 transmits the radio wave stoppage instructions to the general wireless communication apparatuses 54 administered by the frequency administration database 52. This transmission may be made as push notification or may be made as responses to inquiries concerning frequency availability that are made periodically or occasionally by the general wireless communication apparatuses 54, for instance.

<Processing in Case Where Signal of Primary System is Detected>

Figure 7:
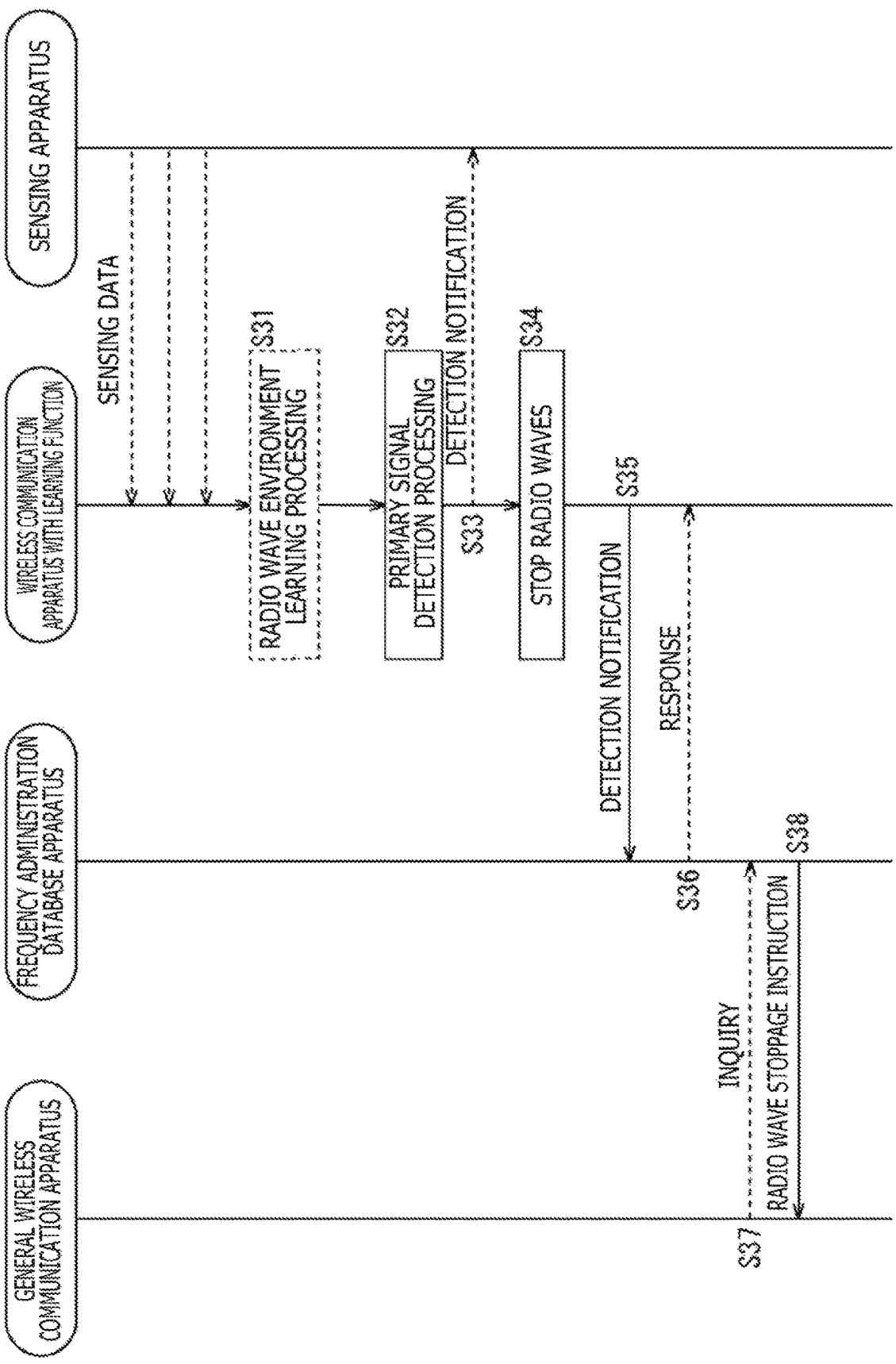
FIG. 7 is a diagram for description of processing in a case where a signal of a primary system is detected.

With reference to a flow chart illustrated in FIG. 7, processing in a case where the signal of the primary system is detected in the wireless communication system 51 will be described.

The wireless communication apparatus 55 with sensing function periodically supplies the sensing data to the wireless communication apparatus 53 with learning sensing function through wireless communication, for instance. In step S31, the information processing apparatus 22 of the wireless communication apparatus 53 with learning sensing function thus carries out the radio wave environment learning processing (see FIG. 3) with use of the sensing data provided from the wireless communication apparatus 55 with sensing function, in addition to the sensing data acquired by the sensor unit 21 of the wireless communication apparatus 53 itself.

Figure 4:
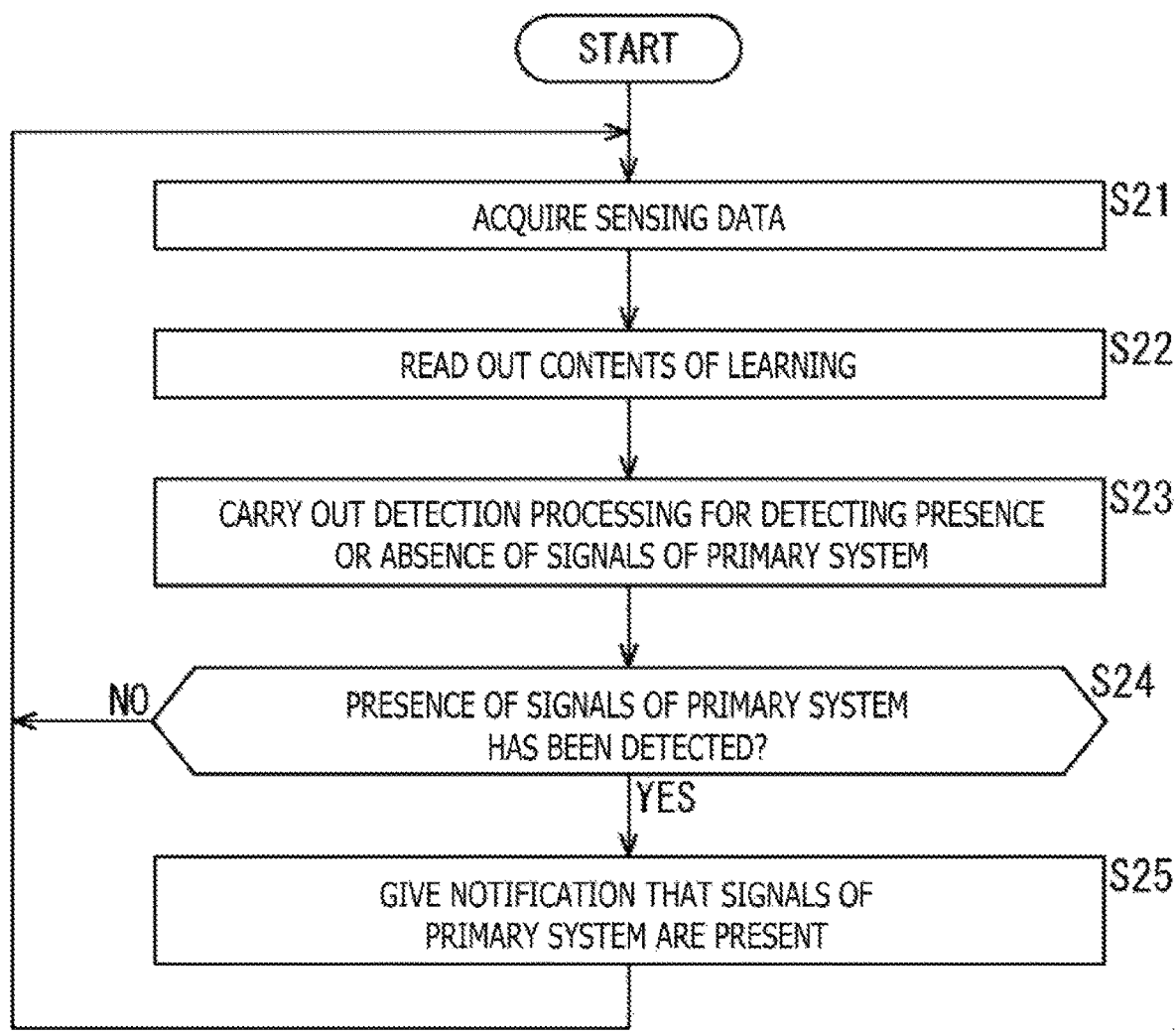
FIG. 4 is a flow chart for description of primary signal detection processing.

In step S32, the information processing apparatus 22 of the wireless communication apparatus 53 with learning sensing function carries out the primary signal detection processing (see FIG. 4). In the information processing apparatus 22, as described above, the primary signal detection processing is iterated at the specified timing until the presence of the signal of the primary system is detected and, if the presence of the signal of the primary system is detected, the processing advances to step S33.

In the wireless communication apparatus 53 with learning sensing function, in step S33, the detection unit 34 notifies the communication processing unit 23 that the presence of the signal of the primary system has been detected. In response, the communication processing unit 23 gives the detection notification (or the radio wave stoppage instruction) to the wireless communication apparatus 55 with sensing function via the wireless communication unit 24 through wireless communication.

In step S34, the communication processing unit 23 controls the wireless communication unit 24 so as to stop the radio waves and the radio waves to be outputted from the wireless communication apparatus 53 with learning sensing function are stopped.

The wireless communication apparatus 53 with learning sensing function gives the detection notification to the frequency administration database 52 through the wired interface, in step S35, and a response is given from the frequency administration database 52, in step S36.

If an inquiry is sent from the general wireless communication apparatuses 54 through the wired interfaces to the frequency administration database 52, in step S37, the frequency administration database 52 gives the radio wave stoppage instructions to the general wireless communication apparatuses 54, in step S38.

If the wireless communication apparatus 53 with learning sensing function detects the presence of the signal of the primary system, as described above, output of the radio waves in all the wireless communication apparatuses can be stopped in the wireless communication system 51.

<Processing in Case where Signal of Primary System Becomes Undetectable>

Figure 8:
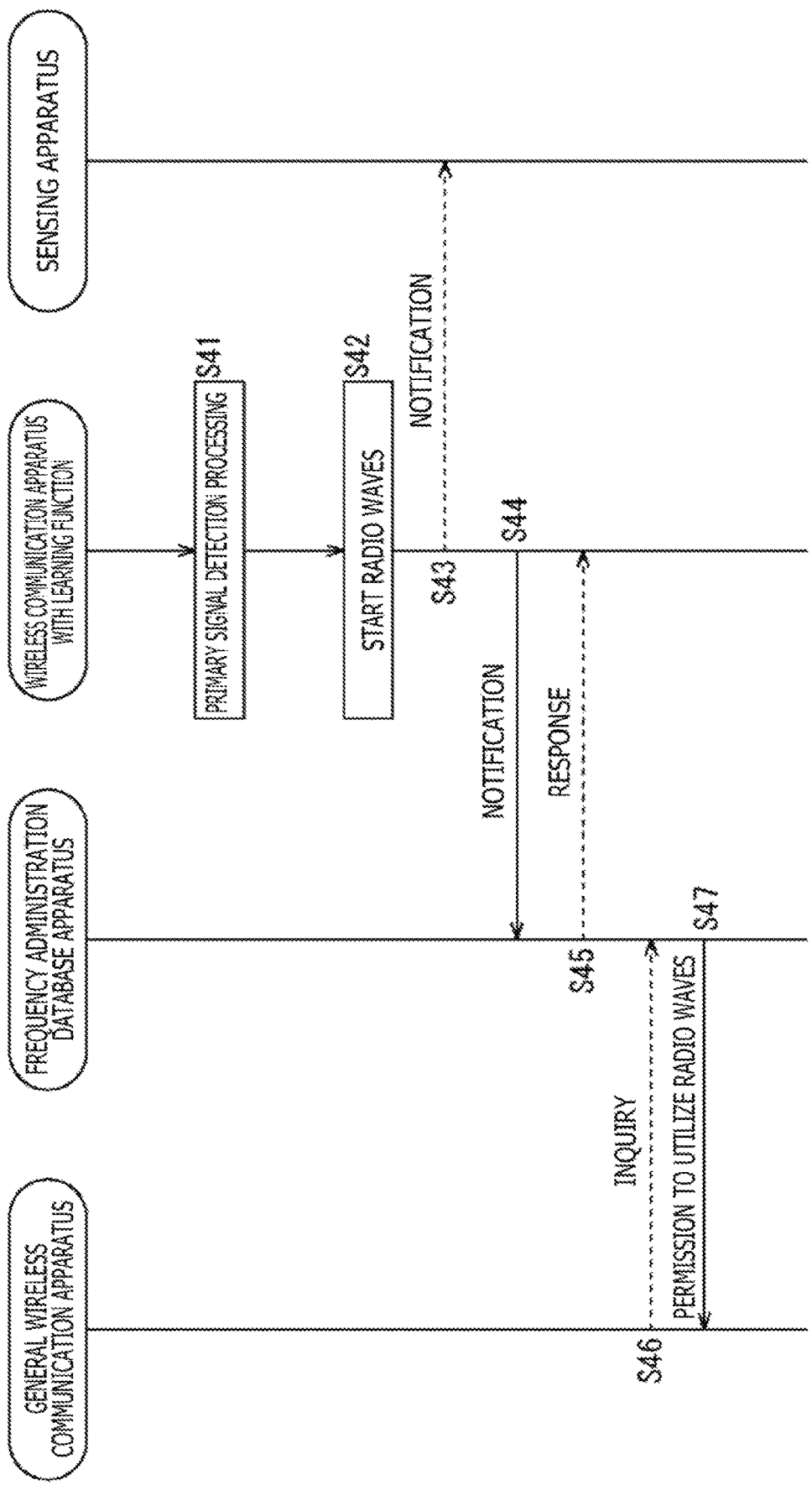
FIG. 8 is a diagram for description of processing in a case where the signal of the primary system becomes undetectable.

With reference to a flow chart illustrated in FIG. 8, processing in a case where the signal of the primary system becomes undetectable in the wireless communication system 51 will be described.

In step S41, the information processing apparatus 22 of the wireless communication apparatus 53 with learning sensing function carries out the primary signal detection processing (see FIG. 4) in a state in which the output of the radio waves is stopped in all the wireless communication apparatuses in the wireless communication system 51 as described with reference to FIG. 7. Herein, the primary signal detection processing is iterated until the absence of the signal of the primary system is detected. When the absence of the signal of the primary system is eventually detected, the detection unit 34 notifies the communication processing unit 23 that the absence of the signal of the primary system has been detected and the processing advances to step S42.

In the wireless communication apparatus 53 with learning sensing function, in step S42, the communication processing unit 23 controls the wireless communication unit 24 so as to start the output of the radio waves and the radio waves are outputted from the wireless communication apparatus 53 with learning sensing function.

In the wireless communication apparatus 53 with learning sensing function, in step S43, the communication processing unit 23 notifies the wireless communication apparatus 55 with sensing function via the wireless communication unit 24 through wireless communication that the absence of the signal of the primary system has been detected.

The wireless communication apparatus 53 with learning sensing function notifies the frequency administration database 52 through the wired interface that the absence of the signal of the primary system has been detected, in step S44, and a response is given from the frequency administration database 52, in step S45.

If an inquiry is sent from the general wireless communication apparatuses 54 through the wired interfaces to the frequency administration database 52, in step S46, the frequency administration database 52 gives the general wireless communication apparatuses 54 permission to utilize the radio waves, in step S47.

If the wireless communication apparatus 53 with learning sensing function detects the absence of the signal of the primary system, as described above, the output of the radio waves can be started in all the wireless communication apparatuses in the wireless communication system 51.

<Configuration Example of Computer>

Herein, the processing described with reference to the flow charts described above does not have to be carried out chronologically in an order described as the flow charts and includes processing that is carried out parallelly or individually (such as parallel processing or processing based on object). In addition, programs may be subjected to processing by a single CPU or may be subjected to distributed processing by a plurality of CPUs.

Furthermore, a series of processing (information processing method) described above can be carried out by hardware or can be carried out by software. In a case where the series of processing is carried out by software, programs that configure the software are installed from a program recording medium in which the programs are recorded, into a computer incorporated in dedicated hardware, a general-purpose personal computer, for instance, capable of performing various functions by various programs installed therein, or the like.

Figure 9:
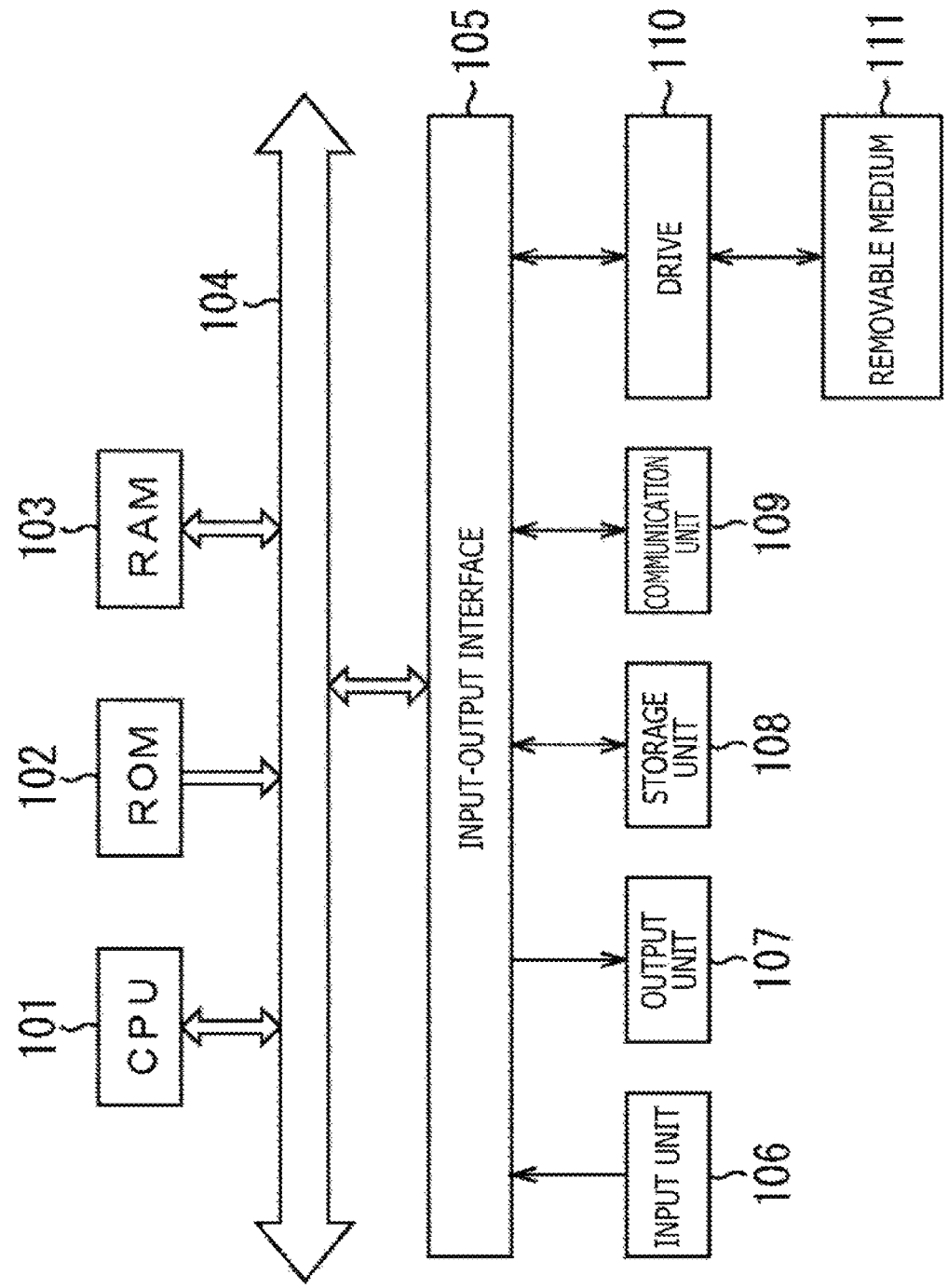
FIG. 9 is a block diagram illustrating a configuration example of an embodiment of a computer to which the present technique is applied.

FIG. 9 is a block diagram illustrating a configuration example of hardware of the computer that carries out the series of processing described above by the programs.

In the computer, a CPU (Central Processing Unit) 101, a ROM (Read Only Memory) 102, and a RAM (Random Access Memory) 103 are connected to one another by a bus 104.

In addition, an input-output interface 105 is further connected to the bus 104. To the input-output interface 105, an input unit 106 including a keyboard, a mouse, a microphone, or the like, an output unit 107 including a display, a speaker, or the like, a storage unit 108 including a hard disk, a nonvolatile memory, or the like, a communication unit 109 including a network interface or the like, and a drive 110 that drives a removable medium 111 such as a magnetic disc, an optical disc, a magneto-optic disc, or a semiconductor memory are connected.

In the computer configured as described above, the CPU 101 loads programs, stored in the storage unit 108, for instance, into the RAM 103 through the input-output interface 105 and the bus 104 and executes the programs, so that the series of processing described above is carried out.

The programs to be executed by the computer (CPU 101) are provided through being recorded in the removable medium 111 as a package medium including a magnetic disc (including a flexible disc), an optical disc (such as a CD-ROM (Compact Disc-Read Only Memory) or a DVD (Digital Versatile Disc)), a magneto-optic disc, a semiconductor memory, or the like or through a wired or wireless transmission medium such as local area network, Internet, or digital satellite broadcasting, for instance.

Furthermore, attachment of the removable medium 111 to the drive 110 enables installation of the programs into the storage unit 108 through the input-output interface 105. In addition, the programs can be received by the communication unit 109 through the wired or wireless transmission medium and can be installed into the storage unit 108. Otherwise, the programs can be preinstalled in the ROM 102, the storage unit 108, or the like.

<Example of Combination of Configurations>

Herein, the present technique can have such configurations as follows.

(1)

An information processing apparatus including:

a learning unit that carries out learning of frequency utilization statistics information regarding a secondary system, with use of information regarding a frequency occupancy situation of the secondary system which shares a frequency or a frequency band allocated to a primary system, at least as teacher information, and with use of sensing data collected by a sensor unit which senses a radio wave environment, as student information; and a detection unit that carries out detection processing for detecting whether or not a signal of the primary system is present, based on the frequency utilization statistics information regarding the secondary system acquired through the learning by the learning unit.

(2)

The information processing apparatus according to above (1), in which, upon detection of the presence of the signal of the primary system, the detection unit gives detection notification or radio wave stoppage instructions to other wireless communication apparatuses utilizing a frequency for the secondary system.

(3)

The information processing apparatus according to above (1) or (2), further including:

an information acquisition unit that acquires the teacher information to be utilized for the learning by the learning unit, from a frequency manager that controls utilization of a frequency by the secondary system.

(4)

The information processing apparatus according to above (3), in which the information acquisition unit acquires an operation parameter for the secondary system as the teacher information, and the learning unit carries out the learning by utilizing the operation parameter for the secondary system.

(5)

The information processing apparatus according to above (3) or (4), further including:

an information retention unit that retains the information acquired by the information acquisition unit and the information acquired through the learning by the learning unit, as contents of learning.

(6)

The information processing apparatus according to above (5), in which the contents of learning retained in the information retention unit are updated through the learning by the learning unit, and the detection unit carries out the detection processing through reading out the contents of learning retained in the information retention unit.

(7)

The information processing apparatus according to above (6), in which the detection unit calculates a degree of correlation between the contents of learning retained in the information retention unit and sensing data collected by the sensor unit and detects whether or not the signal of the primary system is present through a comparison between the degree of correlation and a specified criterion.

(8)

An information processing method including:

by an information processing apparatus that carries out information processing, carrying out learning of frequency utilization statistics information regarding a secondary system, with use of information regarding a frequency occupancy situation of the secondary system which shares a frequency or a frequency band allocated to a primary system, at least as teacher information, and with use of sensing data collected by a sensor unit which senses a radio wave environment, as student information; and carrying out detection processing for detecting whether or not a signal of the primary system is present, based on the frequency utilization statistics information regarding the secondary system acquired through the learning.

(9)

A program that causes a computer of an information processing apparatus which carries out information processing, to execute information processing including:

carrying out learning of frequency utilization statistics information regarding a secondary system, with use of information regarding a frequency occupancy situation of the secondary system which shares a frequency or a frequency band allocated to a primary system, at least as teacher information, and with use of sensing data collected by a sensor unit which senses a radio wave environment, as student information; and carrying out detection processing for detecting whether or not a signal of the primary system is present, based on the frequency utilization statistics information regarding the secondary system acquired through the learning.

(10)

A wireless communication apparatus including:

a learning unit that carries out learning of frequency utilization statistics information regarding a secondary system, with use of information regarding a frequency occupancy situation of the secondary system which shares a frequency or a frequency band allocated to a primary system, at least as teacher information, and with use of sensing data collected by a sensor unit which senses a radio wave environment, as student information;

a detection unit that carries out detection processing for detecting whether or not a signal of the primary system is present, based on the frequency utilization statistics information regarding the secondary system acquired through the learning by the learning unit; and a communication processing unit that gives detection notification or radio wave stoppage instructions through wireless communication to other wireless communication apparatuses utilizing a frequency for the secondary system in a case where the detection unit detects the presence of the signal of the primary system.

Herein, the present embodiment is not limited to the embodiment described above and may be modified in various manners unless departing from the purport of the present disclosure. Additionally, effects described herein are consistently exemplary and not limitative and thus other effects may be brought about.

REFERENCE SIGNS LIST

11 Radio wave environment learning apparatus, 21 Sensor unit, 22 Information processing apparatus, 23 Communication processing unit, 24 Wireless communication unit, 31 Information acquisition unit, 32 Information retention unit, 33 Learning unit, 34 Detection unit, 51 Wireless communication system, 52 Frequency administration database, 53 Wireless communication apparatus with learning sensing function, 54 General wireless communication apparatus, 55 Wireless communication apparatus with sensing function

The invention claimed is:

1. An information processing apparatus, comprising:
a central processing unit (CPU) configured to:
   learn frequency utilization statistics information regarding a secondary system based on:
      information regarding a frequency occupancy situation of the secondary system, at least as teacher information, wherein
         the information regarding the frequency occupancy situation of the secondary system includes at least one of a spectrum mask or a maximum Equivalent Isotropic Radiated Power (EIRP), and
         the secondary system shares one of a frequency or a frequency band allocated to a primary system; and
      a received signal for sensing data collected by a sensor which senses a radio wave environment, as student information, wherein
         based on the received signal for the sensing data, the frequency utilization statistics information is learned by use of a received signal of the secondary system at a specific time and a noise component of the secondary system at the specific time, and
         at least one of a propagation path loss or shadowing attenuation of the radio wave environment is estimated based on the received signal for the sensing data;
   match the sensing data and the frequency utilization statistics information regarding the secondary system acquired through the learning;
   calculate, based on the match, a degree of correlation between the sensing data and the frequency utilization statistics information regarding the secondary system acquired through the learning;
   detect presence of a signal of the primary system based on the degree of correlation that indicates a mismatch between change in frequency characteristics of the sensing data from a first time period to a second time period different from the first time period and the frequency utilization statistics information regarding the secondary system acquired through the learning; and
   output at least one of a detection notification or radio wave stoppage instructions based on the presence of the signal of the primary system, wherein the at least one of the detection notification or the radio wave stoppage instructions are output through a wireless communication to a plurality of wireless communication apparatuses that utilizes the frequency for the secondary system.

2. The information processing apparatus according to claim 1,
wherein the CPU is further configured to acquire the teacher information from a frequency manager that controls utilization of the frequency by the secondary system.

3. The information processing apparatus according to claim 2,
wherein the CPU is further configured to:
   acquire an operation parameter for the secondary system as the teacher information; and learn the frequency utilization statistics information based on the operation parameter for the secondary system.

4. The information processing apparatus according to claim 2, further comprising
a memory configured to retain the information acquired from the frequency manager and the information acquired through the learning, as contents of learning.

5. The information processing apparatus according to claim 4, wherein the CPU is further configured to:
update the contents of learning retained in the memory based on the learning of the frequency utilization statistics information; and
detect the presence of the signal of the primary system based on read out of the contents of learning retained in the memory.

6. An information processing method, comprising:
in an information processing apparatus:
learning frequency utilization statistics information regarding a secondary system based on:
information regarding a frequency occupancy situation of the secondary system, at least as teacher information, wherein
the information regarding the frequency occupancy situation of the secondary system includes at least one of a spectrum mask or a maximum Equivalent Isotropic Radiated Power (EIRP), and
the secondary system shares one of a frequency or a frequency band allocated to a primary system; and
a received signal for sensing data collected by a sensor which senses a radio wave environment, as student information, wherein
based on the received signal for the sensing data, the frequency utilization statistics information is learned by use of a received signal of the secondary system at a specific time and a noise component of the secondary system at the specific time, and
at least one of a propagation path loss or shadowing attenuation of the radio wave environment is estimated based on the received signal for the sensing data;
matching the sensing data and the frequency utilization statistics information regarding the secondary system acquired through the learning;
calculating, based on the matching, a degree of correlation between the sensing data and the frequency utilization statistics information regarding the secondary system acquired through the learning;
detecting presence of a signal of the primary system based on the degree of correlation that indicates a mismatch between change in frequency characteristics of the sensing data from a first time period to a second time period different from the first time period and the frequency utilization statistics information regarding the secondary system acquired through the learning; and
outputting at least one of a detection notification or radio wave stoppage instructions based on the presence of the signal of the primary system, wherein the at least one of the detection notification or the radio wave stoppage instructions are output through a wireless communication to a plurality of wireless communication apparatuses that utilizes the frequency for the secondary system.

7. A non-transitory computer-readable medium having stored thereon computer-executable instructions which, when executed by a computer, cause the computer to execute operations, the operations comprising:
learning frequency utilization statistics information regarding a secondary system based on:
information regarding a frequency occupancy situation of the secondary system, at least as teacher information, wherein
the information regarding the frequency occupancy situation of the secondary system includes at least one of a spectrum mask or a maximum Equivalent Isotropic Radiated Power (EIRP), and
the secondary system shares one of a frequency or a frequency band allocated to a primary system; and
a received signal for sensing data collected by a sensor which senses a radio wave environment, as student information, wherein
based on the received signal for the sensing data, the frequency utilization statistics information is learned by use of a received signal of the secondary system at a specific time and a noise component of the secondary system at the specific time, and
at least one of a propagation path loss or shadowing attenuation of the radio wave environment is estimated based on the received signal for the sensing data;
matching the sensing data and the frequency utilization statistics information regarding the secondary system acquired through the learning;
calculating, based on the matching, a degree of correlation between the sensing data and the frequency utilization statistics information regarding the secondary system acquired through the learning;
detecting presence of a signal of the primary system based on the degree of correlation that indicates a mismatch between change in frequency characteristics of the sensing data from a first time period to a second time period different from the first time period and the frequency utilization statistics information regarding the secondary system acquired through the learning; and
outputting one of a detection notification or radio wave stoppage instructions based on the presence of the signal of the primary system, wherein the at least one of the detection notification or the radio wave stoppage instructions are output through a wireless communication to a plurality of wireless communication apparatuses that utilizes the frequency for the secondary system.

8. A wireless communication apparatus, comprising:
a central processing unit (CPU) configured to:
learn frequency utilization statistics information regarding a secondary system based on:
information regarding a frequency occupancy situation of the secondary system, at least as teacher information, wherein
the information regarding the frequency occupancy situation of the secondary system includes at least one of a spectrum mask or a maximum Equivalent Isotropic Radiated Power (EIRP), and
the secondary system shares one of a frequency or a frequency band allocated to a primary system; and a received signal for sensing data collected by a sensor which senses a radio wave environment, as student information, wherein
  based on the received signal for the sensing data, the frequency utilization statistics information is learned by use of a received signal of the secondary system at a specific time and a noise component of the secondary system at the specific time, and
  at least one of a propagation path loss or shadowing attenuation of the radio wave environment is estimated based on the received signal for the sensing data;
match the sensing data and the frequency utilization statistics information regarding the secondary system acquired through the learning;
calculate, based on the match, a degree of correlation between the sensing data and the frequency utilization statistics information regarding the secondary system acquired through the learning;
detect presence of a signal of the primary system based on the degree of correlation that indicates a mismatch between change in frequency characteristics of the sensing data from a first time period to a second time period different from the first time period and the frequency utilization statistics information regarding the secondary system acquired through the learning; and
output one of a detection notification or radio wave stoppage instructions through a wireless communication to a plurality of wireless communication apparatuses that utilizes the frequency for the secondary system based on the presence of the signal of the primary system.

* * * * *